United States Patent
Hermann et al.

(10) Patent No.: US 11,741,294 B2
(45) Date of Patent: *Aug. 29, 2023

(54) DECOUPLING WEBSITE SERVICE FROM PRESENTATION LAYER

(71) Applicant: Snap Inc., Santa Monica, CA (US)

(72) Inventors: Rodrigo de Proenca Gomes Hermann, Seattle, WA (US); Steven Peng, Seattle, WA (US); Shijin Liang, Bothell, WA (US); John Randolph Mann, Seattle, WA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/661,485

(22) Filed: Apr. 29, 2022

(65) Prior Publication Data

US 2022/0261533 A1    Aug. 18, 2022

Related U.S. Application Data

(63) Continuation of application No. 16/916,600, filed on Jun. 30, 2020, now Pat. No. 11,347,932.

(51) Int. Cl.
*G06F 40/143*    (2020.01)
*G06F 16/957*    (2019.01)
*G06F 40/14*     (2020.01)
*G06F 16/958*    (2019.01)

(52) U.S. Cl.
CPC .......... *G06F 40/143* (2020.01); *G06F 16/958* (2019.01); *G06F 16/9577* (2019.01); *G06F 40/14* (2020.01)

(58) Field of Classification Search
CPC ...... G06F 40/143; G06F 16/958; G06F 40/14; G06F 16/9577
See application file for complete search history.

(56) References Cited

U.S. PATENT DOCUMENTS

| 11,347,932 B2 | 5/2022 | Hermann et al. | |
| 2005/0050454 A1* | 3/2005 | Jennery | G06F 16/9577 707/E17.121 |
| 2014/0281907 A1* | 9/2014 | Baldwin | G06F 40/143 715/234 |

(Continued)

OTHER PUBLICATIONS

U.S. Appl. No. 16/916,600, filed Jun. 30, 2020, Decoupling Web Site Service From Presentation Layer.

(Continued)

*Primary Examiner* — Keith D Bloomquist
(74) *Attorney, Agent, or Firm* — Schwegman Lundberg & Woessner, P.A.

(57) ABSTRACT

Aspects of the present disclosure involve systems and methods for performing operations comprising: retrieving, from a content management system, website generation data; identifying a first type of object in the website generation data; obtaining, from a centralized storage of a plurality of website presentation layers, a first website presentation layer corresponding to the first type of object; and generating, for display on a webpage, a first display element corresponding to the first type of object according to a look and feel defined by the first website presentation layer and having first content defined by the website generation data.

20 Claims, 12 Drawing Sheets

(56) References Cited

U.S. PATENT DOCUMENTS

2014/0310591 A1\* 10/2014 Nguyen ................ G06F 40/143
             715/234
2018/0181549 A1\* 6/2018 Hileman ............... G06F 40/106
2021/0406447 A1 12/2021 Hermann et al.

OTHER PUBLICATIONS

"U.S. Appl. No. 16/916,600, Advisory Action dated Nov. 5, 2021", 2 pgs.
"U.S. Appl. No. 16/916,600, Examiner Interview Summary dated Nov. 12, 2021", 2 pgs.
"U.S. Appl. No. 16/916,600, Final Office Action dated Aug. 27, 2021", 13 pgs.
"U.S. Appl. No. 16/916,600, Non Final Office Action dated Feb. 24, 2021", 10 pgs.
"U.S. Appl. No. 16/916,600, Notice of Allowance dated Feb. 2, 2022", 5 pgs.
"U.S. Appl. No. 16/916,600, Response filed May 21, 2021 to Non Final Office Action dated Feb. 24, 2021", 10 pgs.
"U.S. Appl. No. 16/916,600, Response filed Oct. 27, 2021 to Final Office Action dated Aug. 27, 2021", 9 pgs.

\* cited by examiner

Website Generation Data (JSON)

```
{
  "__typename": "Button",
  "title": "Create an Ad",
  "url": "https://
ads.message.com/
getstarted?rm=create"
}
```

710

Translator and Presentation Layer (JavaScript)

Translator (Javascript)
```
const Button = (props) => {
  const consumerContext = useContext(ConsumerContext);

const renderData = (dataProps) => {
    const { url, title } = dataProps;
    const { redirectTo } = consumerContext;

const onClick = (): void => {
      redirectTo && !isNil(url) && redirectTo(url);
    };

return (
      <ButtonPresentationLayer onClick={onClick}>
        {renderTitle(title)}
      </ButtonPresentationLayer>
    );
  };
};
```

PresentationLayer (Javascript)
```
const ButtonPresentationLayer = memo((( children, onClick
}) => {
  const blockTheme = useContext(BlockThemeContext);
  const theme = buttonThemes[blockTheme][type];

const classNames = css(buttonStyle,
buttonSizeStyles[size], buttonThemeStyles[theme]);

return (
    <button className={classNames} onClick={onClick}>
      {children}
    </button>
  );
});
```

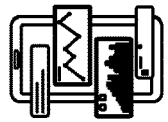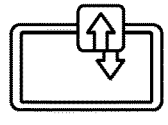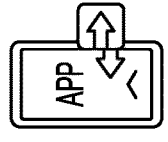
FIG. 9

DECOUPLING WEBSITE SERVICE FROM PRESENTATION LAYER

CLAIM OF PRIORITY

This application is a continuation of U.S. patent application Ser. No. 16/916,600, filed on Jun. 30, 2020, which is incorporated herein by reference in its entirety.

TECHNICAL FIELD

The present disclosure relates generally to website generation and presentation.

BACKGROUND

The popularity of users interacting with other users online continues to grow. There are many ways for users to interact online with other users. Users can communicate with their friends using messaging applications and can play with other users online in multiplayer video games or perform other actions using various other applications. Oftentimes, the main way users communicate with each other and obtain content is via websites.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which:

FIG. 7 is a diagrammatic representation of website data translation, in accordance with some examples.

FIG. 9 is an illustrative website generated by the website generation system, in accordance with some examples.

DETAILED DESCRIPTION

Figure 1:
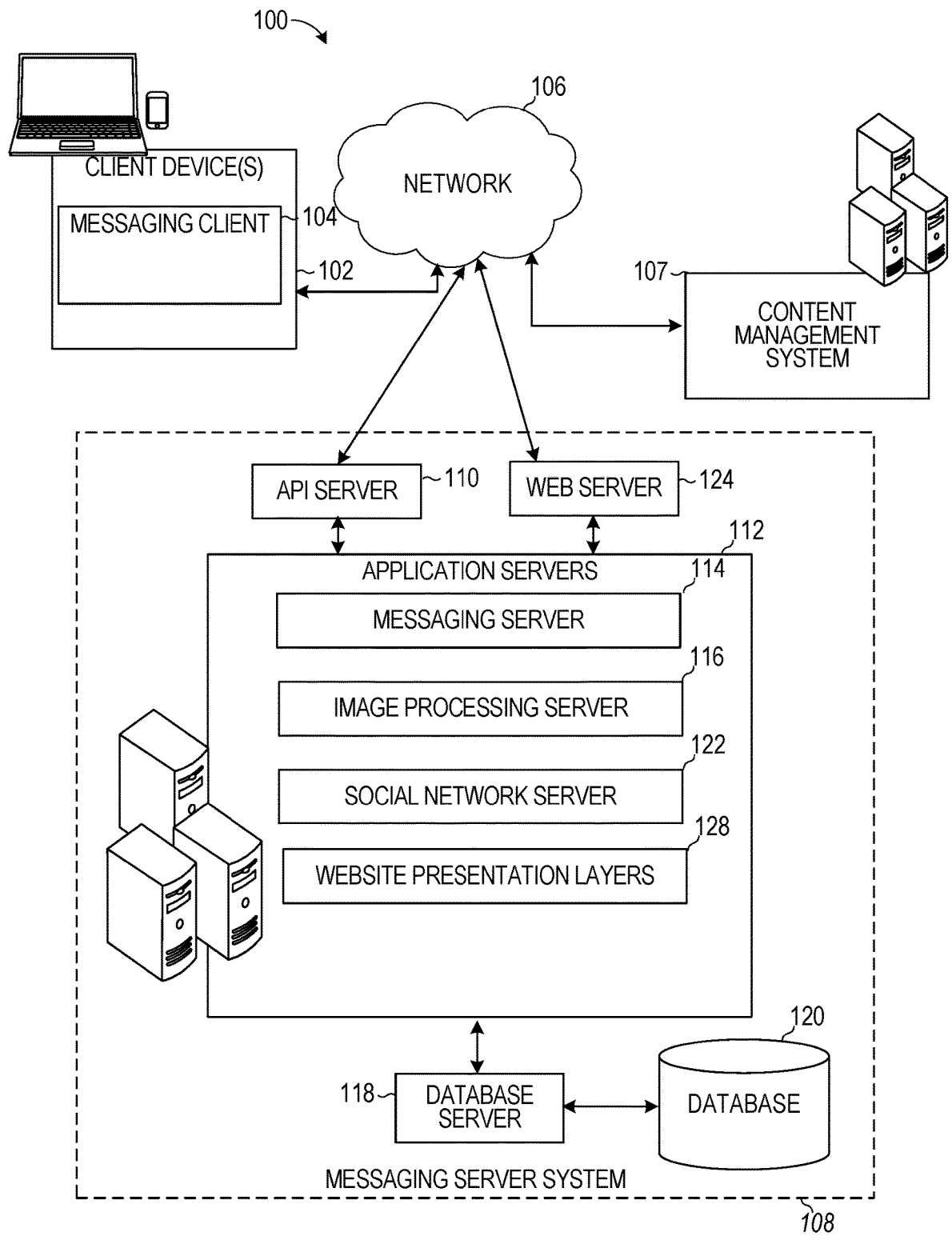
FIG. 1 is a diagrammatic representation of a networked environment in which the present disclosure may be deployed, in accordance with some examples.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Typically, website developers generate websites by defining the content on the web sites, behavior of elements on the websites and the how the content visually looks on the websites. Namely, website developers not only need to generate the content (such as pictures and text) that is on the website but also need to write code for how the content is presented. This process takes a great deal of time, adds expense and slows down the speed at which websites can be launched. Sometimes, entities may avoid updating or creating websites altogether to avoid this long process and expense.

In some cases, a new webpage may need to be added to a given website for a given entity. This new webpage may be generated by the given entity itself or a third-party, such as an advertiser, that would like to present content on the given entity's website. To generate the new webpage, certain elements, such as buttons on the webpage or other interactive or non-interactive components, need to adhere to pre-defined visual specifications that are specific to the given entity. These visual specifications ensure that a consistent look and feel is provided across various webpages of the same entity. That is, a button that appears on one webpage of the entity looks the same (e.g., has the same color scheme, font type and size, and is of a certain shape and size) as another button that appears on another webpage of the entity. Adhering to these specifications further introduces delays and development cost and resources as code segments that define the layout and presentation of the content on the webpage have to be re-written for each new webpage that is added to the website.

The disclosed embodiments improve the efficiency and speed at which websites are developed and launched using a website generation system. The website generation system decouples the presentation component of website or webpage creation from the content of the website or webpage. Specifically, the disclosed website generation system stores various website presentation layers that correspond to different object types on a centralized storage facility, such as a facility associated with a given entity. Website generation data, such as website generation data received from another entity, is obtained that defines only the content and the behavior of the website. A translator identifies a first type of object in the website generation data, such as a button that has certain content. The translator looks up, via a stored map or look-up table, a corresponding first website presentation layer associated with the first type of object. The disclosed website generation system then generates code for displaying on a webpage a first display element corresponding to the first type of object according to a look and feel defined by the first presentation layer and having first content defined by the website generation data. Namely, the website generation system generates code to present on a webpage the button with the specified content (e.g., a text or image or video) provided in the website generation data and which has the visual elements (e.g., has a color scheme, font type and size, and is of a certain shape and size) that meet specifications of the given entity.

In this way, a website developer need only define the content and behavior attributes of the website and does not need to define how the content is presented. By using a translator to look up a website presentation layer corresponding to certain object types in the website generation data provided by various entities, a consistent look and feel can be provided across different webpages of a website associated with a particular entity. The disclosed website generation system further expedites the website development process and reduces the number of resources needed to generate websites by decoupling the visual presentation element generation of the website development process from the content and behavior generation of the website development process. Namely, a new webpage can be created by only specifying the content of the webpage (e.g., the text, images and video) and behavior (e.g., buttons and interactive elements) of the webpage without having to define the look and feel of the content and behavior elements. According to the disclosed embodiments, the device resources (e.g., processor cycles, memory, and power usage) needed to accomplish a task with the device are thereby reduced.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104. Each messaging client 104 is communicatively coupled to other instances of the messaging client 104 and a messaging server system 108 via a network 106 (e.g., the Internet). Messaging server system 108 may include a content management system 107, in which case, each messaging client 104 accesses a website from the content management system 107 via the messaging server system 108. In some implementations, all or a portion of the distributed content management system 107 is implemented externally to the messaging server system 108. In these circumstances, each messaging client 104 accesses a website from the content management system 107 directly via the network 106.

In some embodiments, the messaging client 104 implements a web browser application that requests a website from the content management system 107. In response, the messaging client 104 receives website generation data from the content management system 107. The messaging client 104 processes the website generation data to identify an object of a given type. The messaging client 104 uses a translator that is locally stored or remotely stored on database 120 to identify a website presentation layer associated with the given type of object. The messaging client 104 retrieves the identified website presentation layer from the website presentation layers 128 and generates code for presenting the object with visual components having a certain look and feel (e.g., having certain font type, color, and size, and having certain graphical properties, such as element shape, size and color) using the retrieved website presentation layer. As an example, the website generation data may define content and behavior of the webpage according to an XML specification (or JSON file) and the website presentation layer provides JavaScript code segments for presenting the content and behavior with centralized and shared look and feel. The messaging client 104 then presents on the client device 102, such as on the web browser application, a webpage with the content defined by the website generation data and having a look and feel defined by the website presentation layer of various types of objects in the website generation data.

A messaging client 104 is able to communicate and exchange data with another messaging client 104 and with the messaging server system 108 via the network 106. The data exchanged between messaging client 104, and between a messaging client 104 and the messaging server system 108, includes functions (e.g., commands to invoke functions) as well as payload data (e.g., text, audio, video or other multimedia data).

The messaging server system 108 provides server-side functionality via the network 106 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 110 is coupled to, and provides a programmatic interface to, application servers 112. The application servers 112 are communicatively coupled to a database server 118, which facilitates access to a database 120 that stores data associated with messages processed by the application servers 112. Similarly, a web server 124 is coupled to the application servers 112, and provides web-based interfaces to the application servers 112. To this end, the web server 124 processes incoming network requests over the Hypertext Transfer Protocol (HTTP) and several other related protocols.

The Application Program Interface (API) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client 104 in order to invoke functionality of the application servers 112. The Application Program Interface (API) server 110 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 114, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 112 host a number of server applications and subsystems, including for example a messaging server 114, an image processing server 116, and a social network server 122. The messaging server 114 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 114, in view of the hardware requirements for such processing.

The application servers 112 also include an image processing server 116 that is dedicated to performing various image processing operations, typically with respect to images or video within the payload of a message sent from or received at the messaging server 114.

Figure 3:
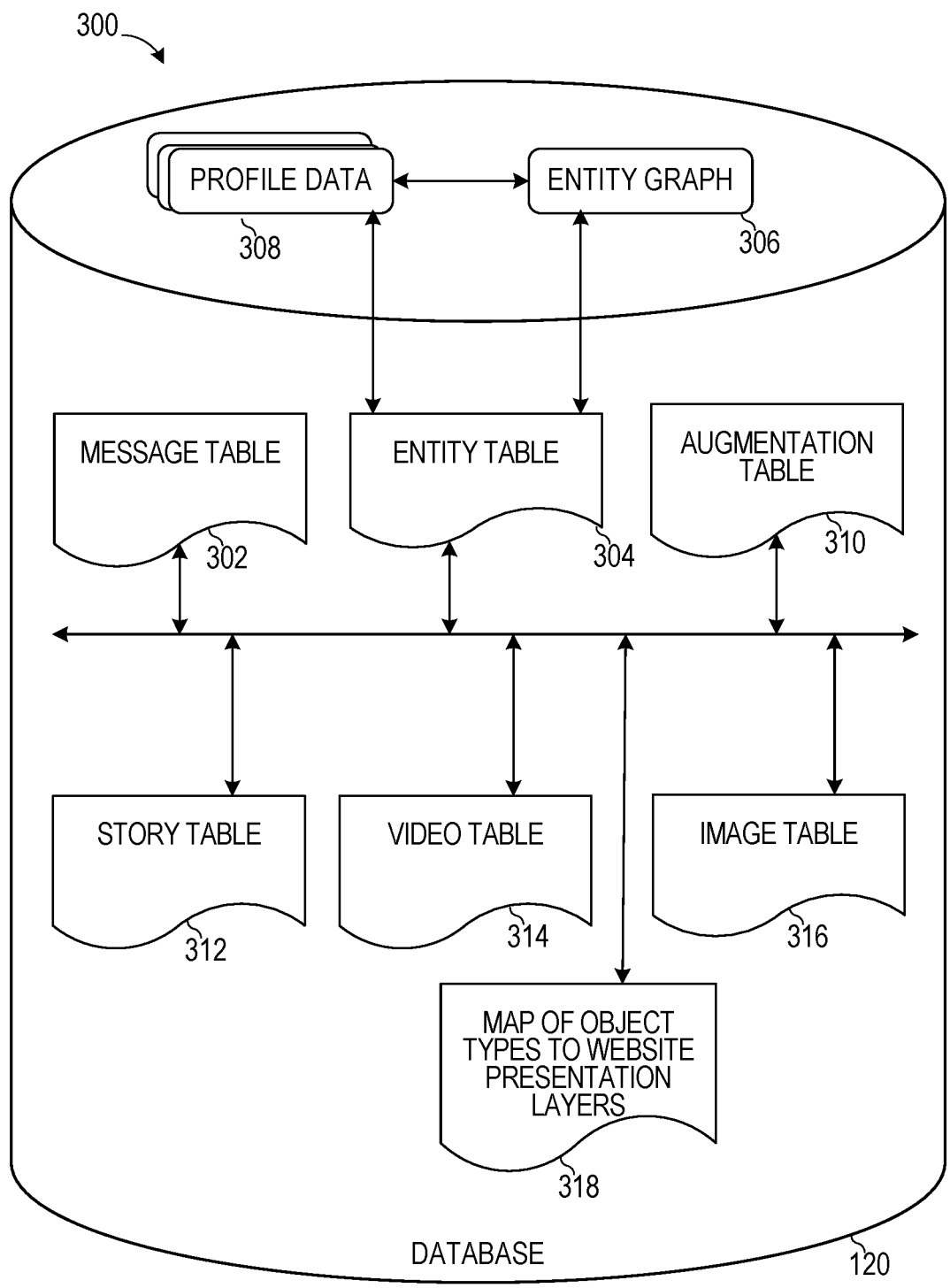
FIG. 3 is a diagrammatic representation of a data structure as maintained in a database, in accordance with some examples.

The social network server 122 supports various social networking functions and services and makes these functions and services available to the messaging server 114. To this end, the social network server 122 maintains and accesses an entity graph 306 (as shown in FIG. 3) within the database 120. Examples of functions and services supported by the social network server 122 include the identification of other users of the messaging system 100 with which a particular user has relationships or is "following," and also the identification of other entities and interests of a particular user.

The website presentation layers 128 store a plurality of website presentation layers. Each website presentation layer defines a specific look and feel for a specific type of object that is presented on a web site. Each website presentation layer includes code segments that define the font size, font type, font color, graphical element shape, size, and color for different object types. For example, a first type of object, such as a button that is linked to another webpage, may be associated with a first website presentation layer that presents the button in a certain color and in a certain shape, such as an oval with a yellow background. A second type of object, such as a button that causes an application to be downloaded, may be associated with a second website presentation layer that presents the button in a different color and in a different shape, such as a square with a red background. A third type of object, such as a static title of the webpage, may be associated with a third website presentation layer that presents the title in a certain color and in a certain font type and size. In some cases, the website presentation layers also define the position and placement of the objects on the webpage, such as at the top, bottom, side, or as a pop-up on the webpage. In some cases, the website presentation layers 128 are stored as react components.

The content management system 107 stores website generation data for various entities. This content management system 107 may be a central repository of website data that is used to present websites. As new websites are created, their respective code (e.g., JSON or XML code) is uploaded and stored on the content management system 107. In some cases, the content management system 107 also stores in a separate repository the translator that maps different object types to different website presentation layers 128. In some cases, the website presentation layers 128 are stored on the content management system 107. The content management system 107 provides specifications for how object types are defined in website generation data, which is used by developers to generate the content and behavior of websites. Different entities can develop and upload different website generation data that use the same scheme to define object types. The object types are associated with the same shared website presentation layers 128 for presenting the visual elements of the website generation data which creates a consistent look and feel for webpages that are developed by different entities.

For example, different entities can develop webpages for presentation on a website associated with a particular entity, and because the visual presentation of the website elements is controlled by the particular entity through the website presentation layers 128, those webpages can be presented with a consistent look and feel associated with the particular entity without the different entities having to define the look and feel of the elements. Namely, the various entities only need to define the content and behavior aspects of the website and use consistent object type naming for the content and behavior aspects that are defined. The content management system 107 can use the website presentation layers 128 that are provided by a specific entity to control the look and feel of how the content and behavior aspects of the website are presented to a user.

System Architecture

Figure 2:
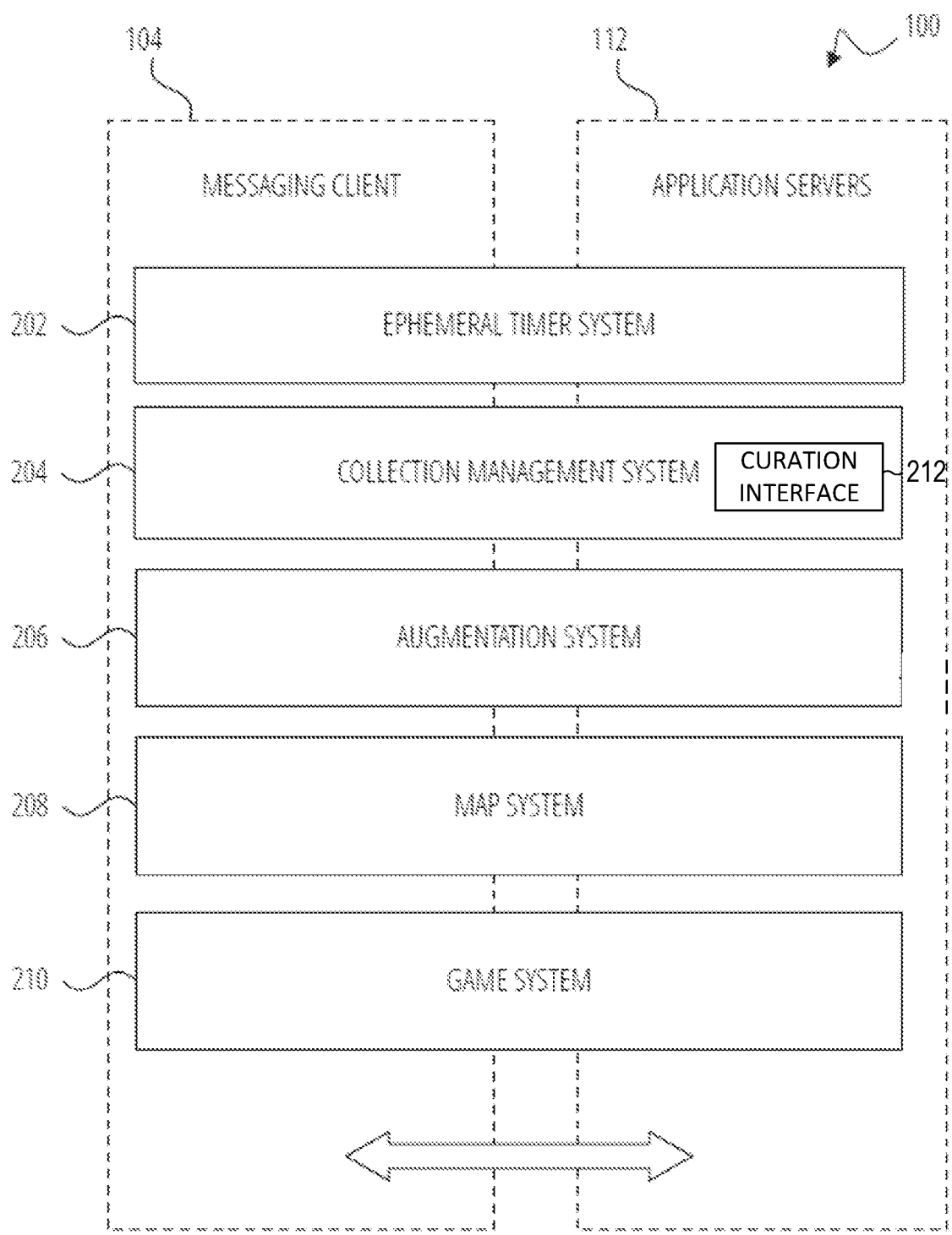
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 112. The messaging system 100 embodies a number of subsystems, which are supported on the client side by the messaging client 104 and on the sever side by the application servers 112. These subsystems include, for example, an ephemeral timer system 202, a collection management system 204, an augmentation system 206, a map system 208, and a game system 210.

The ephemeral timer system 202 is responsible for enforcing the temporary or time-limited access to content by the messaging client 104 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 212 that allows a collection manager to manage and curate a particular collection of content. For example, the curation interface 212 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 104 based on a geolocation of the client device 102. In another example, the augmentation system 206 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 208 provides various geographic location functions, and supports the presentation of map-based media content and messages by the messaging client 104. For example, the map system 208 enables the display of user icons or avatars (e.g., stored in profile data 308) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 210 provides various gaming functions within the context of the messaging client 104. The messaging client 104 provides a game interface providing a list of available games (e.g., web-based games or web-based applications) that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

Data Architecture

FIG. 3 is a schematic diagram illustrating data structures 300, which may be stored in the database 120 of the messaging server system 108, according to certain examples. While the content of the database 120 is shown to comprise a number of tables, it will be appreciated that the data could be stored in other types of data structures (e.g., as an object-oriented database).

The database 120 includes message data stored within a message table 302. This message data includes, for any one particular message, at least message sender data, message recipient (or receiver) data, and a payload. Further details regarding information that may be included in a message, and included within the message data stored in the message table 302, is described below with reference to FIG. 4.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization), interested-based, or activity-based, merely for example.

The profile data 308 stores multiple types of profile data about a particular entity. The profile data 308 may be selectively used and presented to other users of the messaging system 100, based on privacy settings specified by a particular entity. Where the entity is an individual, the profile data 308 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 308 for the group may similarly include one or more avatar representations associated with the group, in addition to the group name, members, and various settings (e.g., notifications) for the relevant group.

The database 120 also stores augmentation data, such as overlays or filters, in an augmentation table 310. The augmentation data is associated with and applied to videos (for which data is stored in a video table 314) and images (for which data is stored in an image table 316).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 316 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudo-random animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of objects' elements, characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other examples, other methods and algorithms suitable for face detection can be used. For example, in some embodiments, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 314 stores video data that, in one example, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314.

A map of object types to website presentation layers 318 stores a mapping that associates different object types defined in website generation data to corresponding website presentation layers 128. The map of object types to website presentation layers 318 is used by a translator to identify and retrieve the corresponding website presentation layer 318 for a given object type that is identified and detected in website generation data retrieved from the content management system 107. For example, the map of object types to website presentation layers 318 associates a first type of object, such as a button that is linked to another webpage, with a first website presentation layer that presents the button in a certain color and in a certain shape, such as an oval with a yellow background. The map of object types to website presentation layers 318 associates a second type of object, such as a button that causes an application to be downloaded with a second website presentation layer that presents the button in a different color and in a different shape, such as a square with a red background. The map of object types to website presentation layers 318 associates a third type of object, such as a static title of the webpage, with a third web site presentation layer that presents the title in a certain color and in a certain font type and size.

Data Communications Architecture

Figure 4:
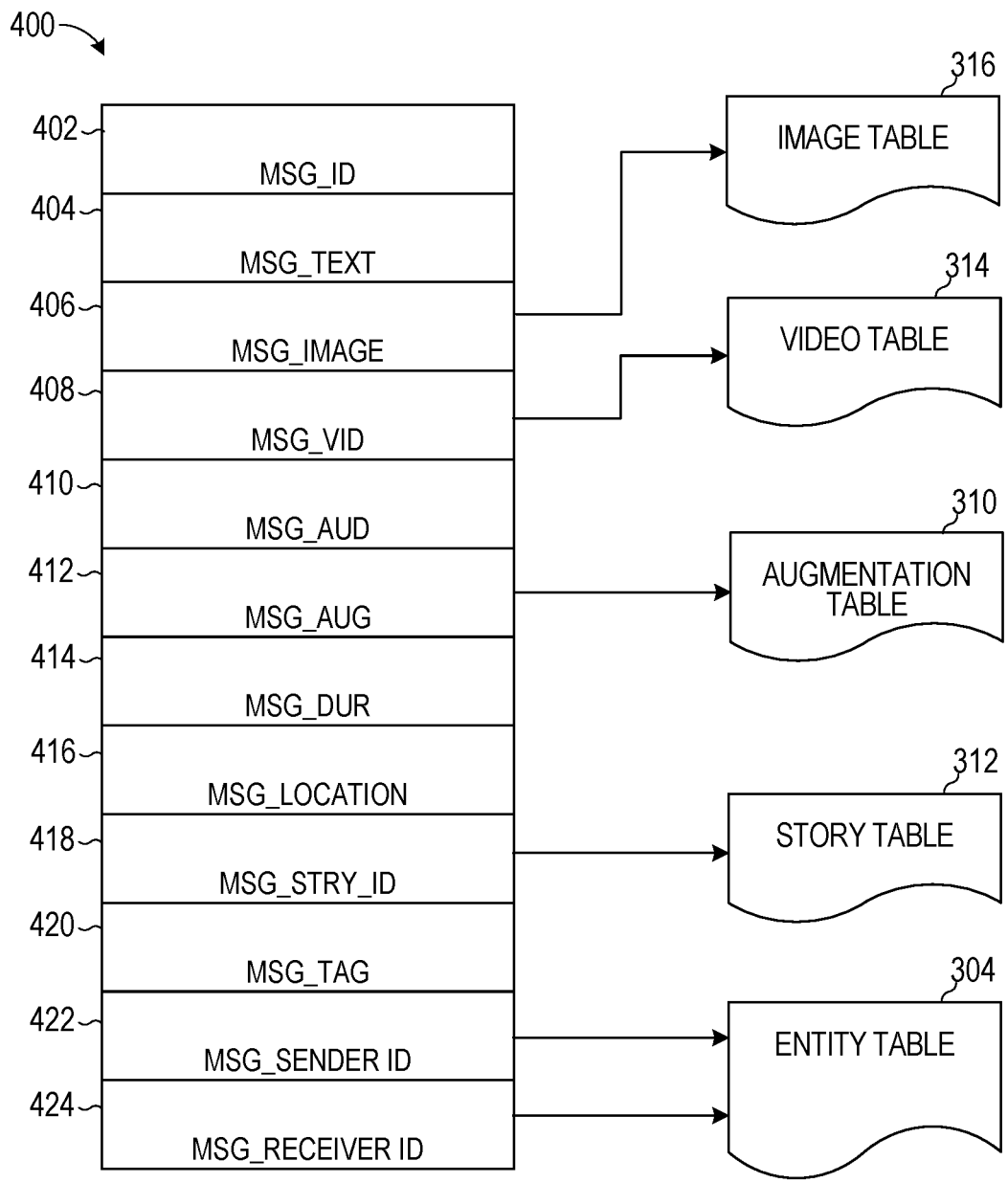
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 114. The content of a particular message 400 is used to populate the message table 302 stored within the database 120, accessible by the messaging server 114. Similarly, the content of a message 400 is stored in memory as "in-transit" or "in-flight" data of the client device 102 or the application servers 112. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 316.
- message video payload 408: video data, captured by a camera component or retrieved from a memory component of the client device 102, and that is included in the message 400. Video data for a sent or received message 400 may be stored in the video table 314.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data 412 for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).
- message story identifier 418: identifier values identifying one or more content collections (e.g., "stories" identified in the story table 312) with which a particular content item in the message image payload 406 of the message 400 is associated. For example, multiple images within the message image payload 406 may each be associated with multiple content collections using identifier values.
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- message sender identifier 422: an identifier (e.g., a messaging system identifier, email address, or device identifier) indicative of a user of the client device 102 on which the message 400 was generated and from which the message 400 was sent.
- message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316.

Similarly, values within the message video payload 408 may point to data stored within a video table 314, values stored within the message augmentation data 412 may point to data stored in an augmentation table 310, values stored within the message story identifier 418 may point to data stored in a story table 312, and values stored within the message sender identifier 422 and the message receiver identifier 424 may point to user records stored within an entity table 304.

Figure 5:
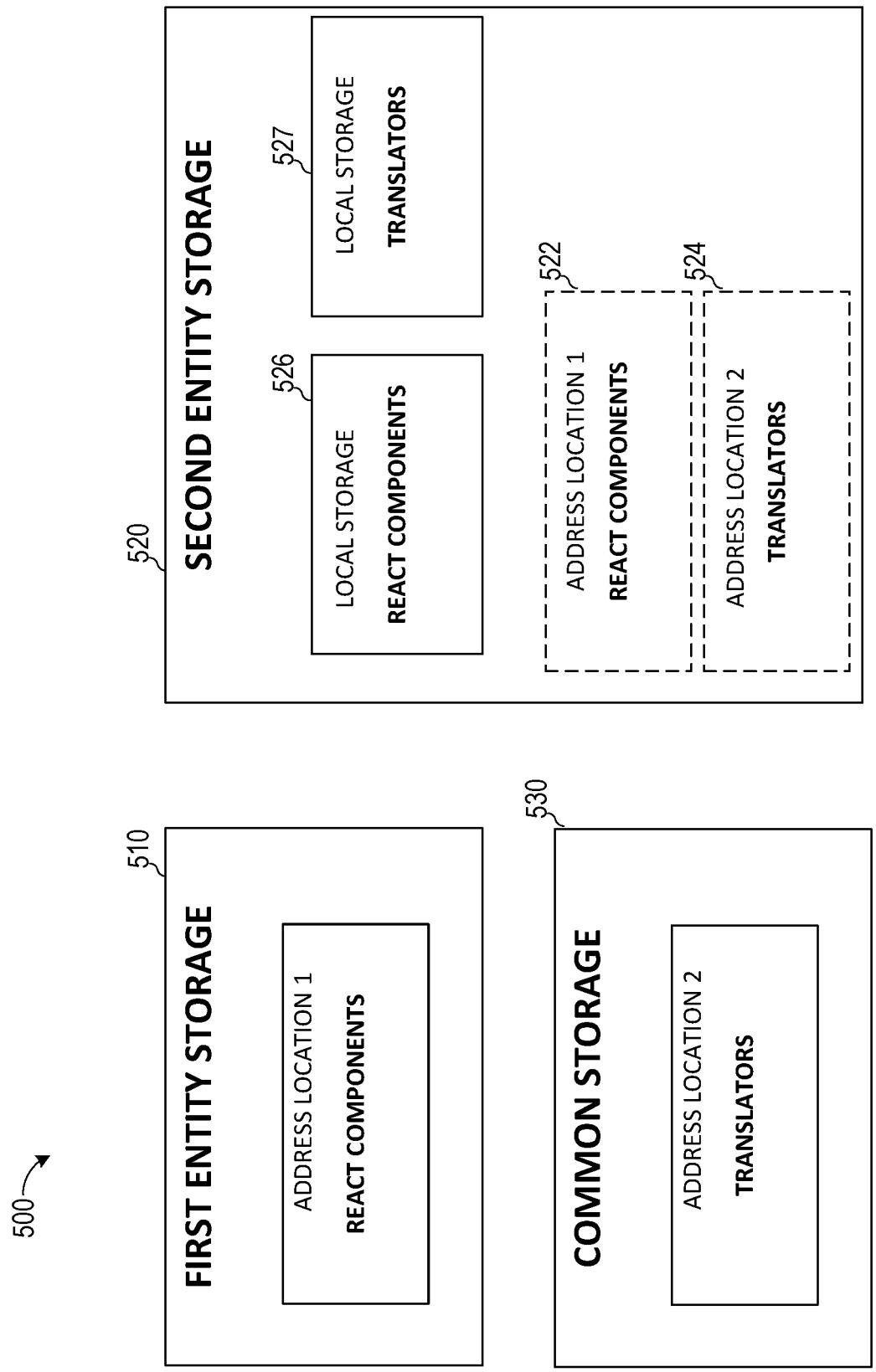
FIG. 5 is a diagrammatic representation of a website generation system, in accordance with some examples.

FIG. 5 is a diagrammatic representation of a website generation system 500, in accordance with some examples. Specifically, the website generation system 500 includes various storage repositories that may be associated with the same or different entities. Some of the storage repositories shown in website generation system 500 may be stored in content management system 107 and others may be stored in application servers 112. In some implementations, all of the storage repositories shown in website generation system 500 may be stored in content management system 107. In some implementations, all of the storage repositories shown in website generation system 500 may be stored in application servers 112.

A second entity storage repository 520 may include various components for generating a website. The components include local react components 526 (also referred to herein as "website presentation layer"), translators 527, references to react components 522 (also referred to herein as "website presentation layer") stored in a first entity storage repository 510 and references to translators 524 stored in a common storage repository 530. As an example, a third-party entity relative to the first entity (e.g., an entity that provides the messaging client 104) may define the content and behavior of a given website and upload and store that data as website generation data in the second entity storage repository 520. The content and behavior may utilize a data model that is common to generation of websites that is used by various entities to define various objects, such as buttons, text, and images that are presented on the website. The data model provides various data object types and specifies ways to define the different object types in website generation data.

The third-party entity may define the content and behavior of the given website without defining the presentation or visual aspects of the content. Namely, the third-party entity defines the content and behavior without specifying the look and feel of the content and behavior. In some cases, the third-party entity uses the data object types defined by the data model to cause a shared website presentation layer to be used to generate the look and feel of the data objects of the given website content. For example, the third-party entity may reference a first type of data object using the data model to cause a button to appear on the website with a look and feel defined by the first entity.

During rendering of the website on a client device 102, the address of the common storage repository 530 is used by the website generation data stored in the second entity storage repository 520 to retrieve one or more translators 524 associated with the first entity. The translators 524 are then used to map the first type of data object to a corresponding website presentation layer. The website presentation layer 522 (e.g., a react component) is retrieved from the first entity storage repository 510. The retrieved website presentation layer 522 generates code for providing the look and feel for the content of the first type of data object. For example, the website presentation layer 522 generates a portion of the webpage for rendering a button having a specified size, color, shape and font style and color for presenting text, image, or video of the content defined by the website generation data. Other types of data objects defined by the website generation data are similarly rendered for display on the webpage using the corresponding website presentation layer 522 identified by the translator 524.

In some cases, the given entity may define some presentation layer, such as the look and feel, of some data objects that are not included in the website presentation layers 522. For example, the given entity may define the look and feel for a specific type of button that is presented on the webpage. To do so, the given entity may define one or more translators 527 that map to a corresponding website presentation layer 526 that is also defined by the given entity. When the given website is rendered for display, the translators 527 detect an object type that is in the website generation data that is mapped to the website presentation layer 526 that was defined by the given entity. The website presentation layer 526 generates the code for displaying the object type with the look and feel defined by the given entity. In this way, some portions of the webpage that are displayed based on the website generation data provided by the given entity can be displayed according to the shared presentation layer defined by the first entity while other portions of the webpage are displayed according to the presentation layer defined by the given entity. By using the shared presentation layers provided by the first entity, the amount of time and resources needed to create and define a website are reduced as the look and feel of certain object types on the website need not be defined by the given entity. This also ensures that a webpage defined by the given entity for presentation on a website hosted by the first entity has a consistent look and feel as other webpages displayed on the website hosted by the first entity that may have been generated based on website generation data provided by other entities.

Figure 6:
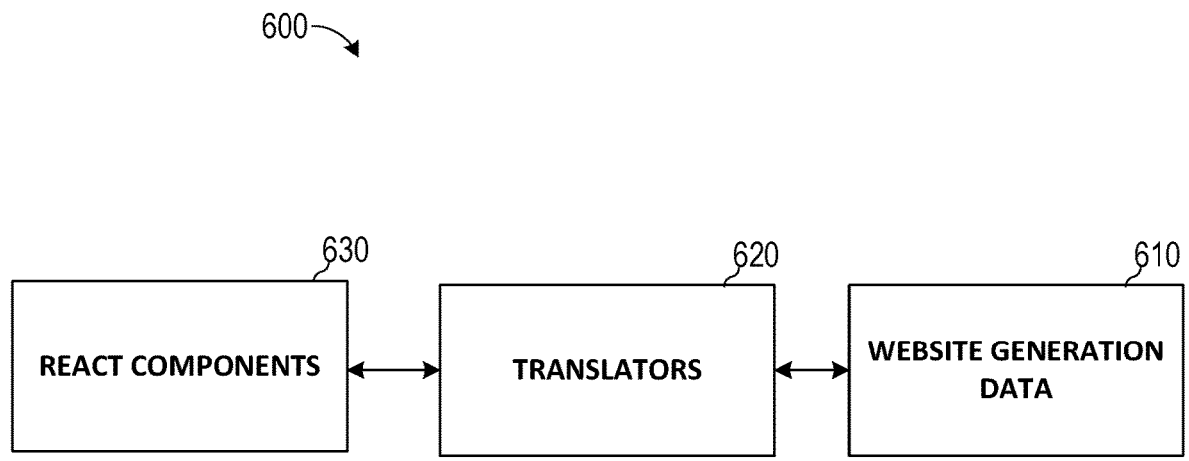
FIG. 6 is another diagrammatic representation of a website generation system, in accordance with some examples.

FIG. 6 is another diagrammatic representation of a website generation system 600, in accordance with some examples. Specifically, as shown in FIG. 6, website generation data 610 is retrieved from the content management system 107. This website generation data 610 is processed, such as locally by a web browser implemented on the client device 102 or by the application servers 112. For example, the web browser may access a particular website address. The website address may be hosted by application servers 112 and may instruct the application servers 112 to retrieve the website generation data corresponding to the address from the content management system 107. The application servers 112 process the website generation data to detect and identify one or more object types defined by the website generation data. In some cases, the website generation data is provided by a third-party entity relative to the entity associated with the application servers 112.

The application servers 112 access translators 620 that may be locally stored or stored on a remote database, such as on database 120. The translators 620 map or determine the website presentation layers associated with each object type defined by the website generation data. Namely, the translators 620 access the react components 630 to map the object type to the corresponding website presentation layers. One or more website presentation layers 128 are retrieved and used to process the content of the website generation data for the corresponding object types to generate webpage code for presenting the object types with a specific look and feel. For example, a first object type may be presented with one look and feel that differs from the look and feel of a second object type. The webpage code is then provided by the application servers 112 to the web browser on the client device 102 for rendering the display of the webpage on the client device 102.

FIG. 7 shows an illustrative conversion 700 of the website generation data to code that is used to render a display of the website generation data using the website presentation layer defined by the first entity. Specifically, the website generation data provided by the second entity may define one or more object types using an JSON file 710, as shown in FIG. 7. Namely, the object types are defined to include certain text, images, or videos without defining the look and feel of those text, images or videos. The translator and the website presentation layer processes the JSON file 710 and generates a JavaScript file 720 that defines the look and feel for the object types defined in the JSON file 710. A web browser application processes the JavaScript file 720 to render a display of the object types using the look and feel defined by the website presentation layers.

In some implementations, after the given entity (e.g., the third-party relative to the first entity that provides the messaging client 104) generates the website generation data, the look and feel of certain or all of the object types included in the website generation data is controlled by the first entity. In this way, at one point in time, the webpage corresponding to the website generation data has a first look and feel for the object types. At a later point in time, the first entity may update or change some of the website presentation layers of the object types included in the webpage. In this case, at the later point in time, the same content and behavior of the webpage has a different second look and feel for certain object types without the given entity having to make any changes to the website generation data. Any webpage that uses the website presentation layers provided by the first entity similarly is automatically updated to have the updated or changed look and feel defined by the first entity.

Figure 8:
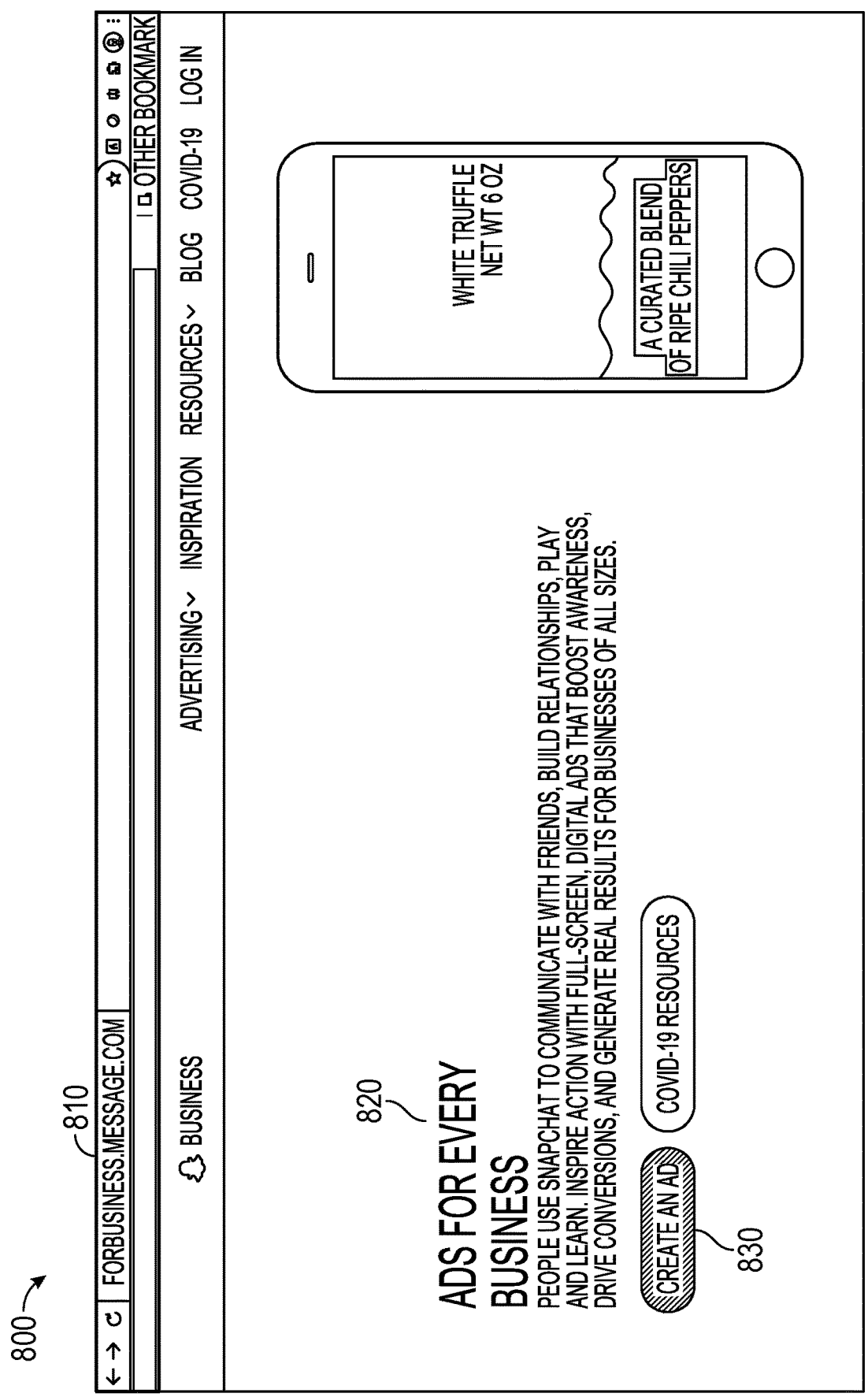
FIG. 8 is an illustrative website generated by the website generation system, in accordance with some examples.

As an example, a second entity may define the object and behavior of a given webpage that is presented on a website hosted by the first entity. The look and feel of the webpage is controlled by the first entity. FIG. 8 shows an illustrative webpage 800 that is rendered for display based on processing the website generation data provided by the second entity and using the website presentation layers provided by the first entity. The webpage is accessed using a first address 810 and includes a first object type 820 (e.g., a title) and a second object type 830 (e.g., a button). The first object type 820 is presented with a first look and feel that is defined by the first entity and the second object type 820 is presented with a second look and feel defined by the first entity. Specifically, the text using a font size, style and color of the first object type 820 is shown on the webpage 800. The second entity only includes the text for the first object type 820 in the website generation data, and the presentation layer provided by the first entity for the first object type 820 determines the look and feel for the text in the website generation data.

As another example, the text, image or video is presented in a button with a font size, style, and color; and shape type of a plurality of shapes; and background color and size of the second object type 830 as shown on the webpage 800. The second entity only includes the text, image or video for the second object type 830 in the website generation data, and the behavior (e.g., the link or address that is accessed if the second object type 830 is selected by the user), and the presentation layer provided by the first entity for the second object type 830 determines the look and feel for the text, image or video in the website generation data.

Another webpage 900 that is defined by a third entity or the first or second entity is shown in FIG. 9. The look and feel of the webpage 900 is controlled by the first entity. The webpage 900 is accessed using a second address 910 and includes a button 920 that corresponds to the second object type 830 shown in FIG. 8. Namely, both webpages 800 and 900 include a common object type (e.g., a button) for which the look and feel is determined by the presentation layer defined by the first entity. The third entity only includes the text, image or video for the second object type 830 in the website generation data, and the presentation layer provided by the first entity for the second object type 830 determines the look and feel for the button 920 in the website generation data. As shown, the look and feel for the button 920 presented on the second webpage 900 is the same as the look and feel of the button corresponding to the second object type 830 presented on the first webpage 800. This is because both buttons are rendered using the shared presentation layer provided by the first entity. Neither the second nor the third entity needs to define the look and feel for the buttons presented on the webpages 800 and 900. Namely, the button 920 on the second webpage 900 has the same shape, font style, size, and background color as the button corresponding to the second object type 830 presented on the first webpage 800.

Figure 10:
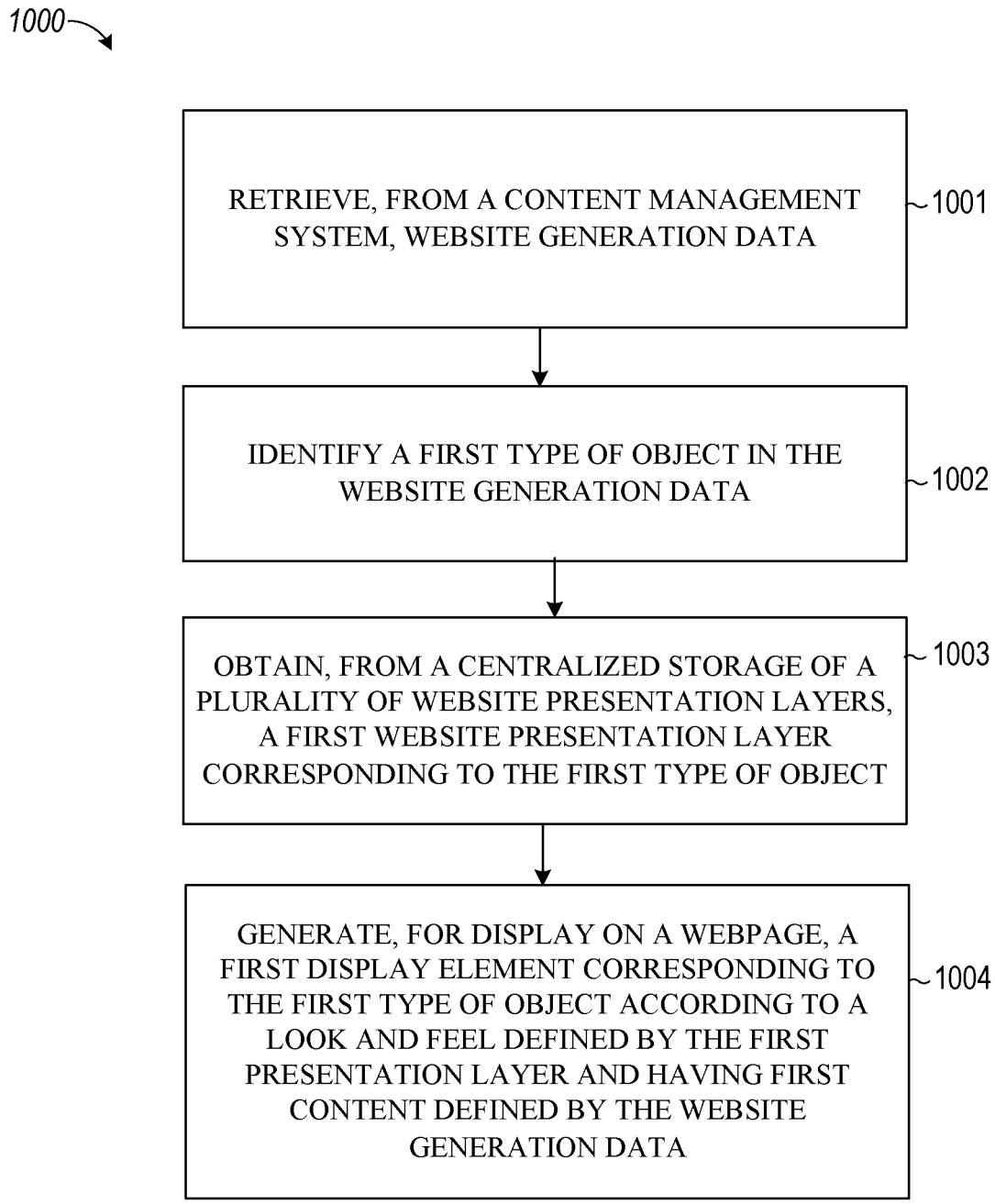
FIG. 10 is a flowchart illustrating example operations of the website generation system, according to example embodiments.

FIG. 10 is a flowchart illustrating example operations of the website generation system in performing a process 1000, according to example embodiments. The process 1000 may be embodied in computer-readable instructions for execution by one or more processors such that the operations of the process 1000 may be performed in part or in whole by the functional components of the content management system 107; accordingly, the process 1000 is described below by way of example with reference thereto. However, in other embodiments at least some of the operations of the process 1000 may be deployed on various other hardware configurations, such as on application servers 112. The operations in the process 1000 can be performed in any order, in parallel, or may be entirely skipped and omitted At operation 1001, a client device 102 retrieves from a content management system, website generation data. For example, a web browser application, implemented on the client device 102, may specify an address from which a webpage is to be loaded. The address may instruct application servers 112 to retrieve website generation data from the content management system 107.

At operation 1002, the client device 102 or servers 112 identify a first type of object in the website generation data. For example, the servers 112 process the retrieved website generation data to identify a first type of object (e.g., a button) that is defined by the content and behavior of the website generation data.

At operation 1003, the client device 102 or servers 112 obtains, from a centralized storage of a plurality of website presentation layers, a first website presentation layer corresponding to the first type of object. For example, the servers 112 obtain a translator from the content management system 107 or from a database 120. The translator identifies the storage location or address of one or more website presentation layers 128. The translator maps the first type of object to one of the website presentation layers 128. The servers 112 obtain the website presentation layer 128 corresponding to the first type of object.

At operation 1004, the client device 102 generates, for display on a webpage, a first display element corresponding to the first type of object according to a look and feel defined by the first presentation layer and having first content defined by the website generation data. For example, the servers 112 convert or generate code for displaying the webpage by processing the first type of object content (e.g., the text, image or video defined by the website generation data) using the obtained website presentation layer 128. The code is provided to the web browser on the client device 102 (such as in response to receiving the request from the client device 102 for the webpage at the address specified by the client device 102). The web browser presents the webpage in which various content types (defined by the content and behavior) defined by the website generation data stored on the content management system 107 are presented with a look and feel defined by the website presentation layers 128 corresponding to the content types.

Machine Architecture

Figure 11:
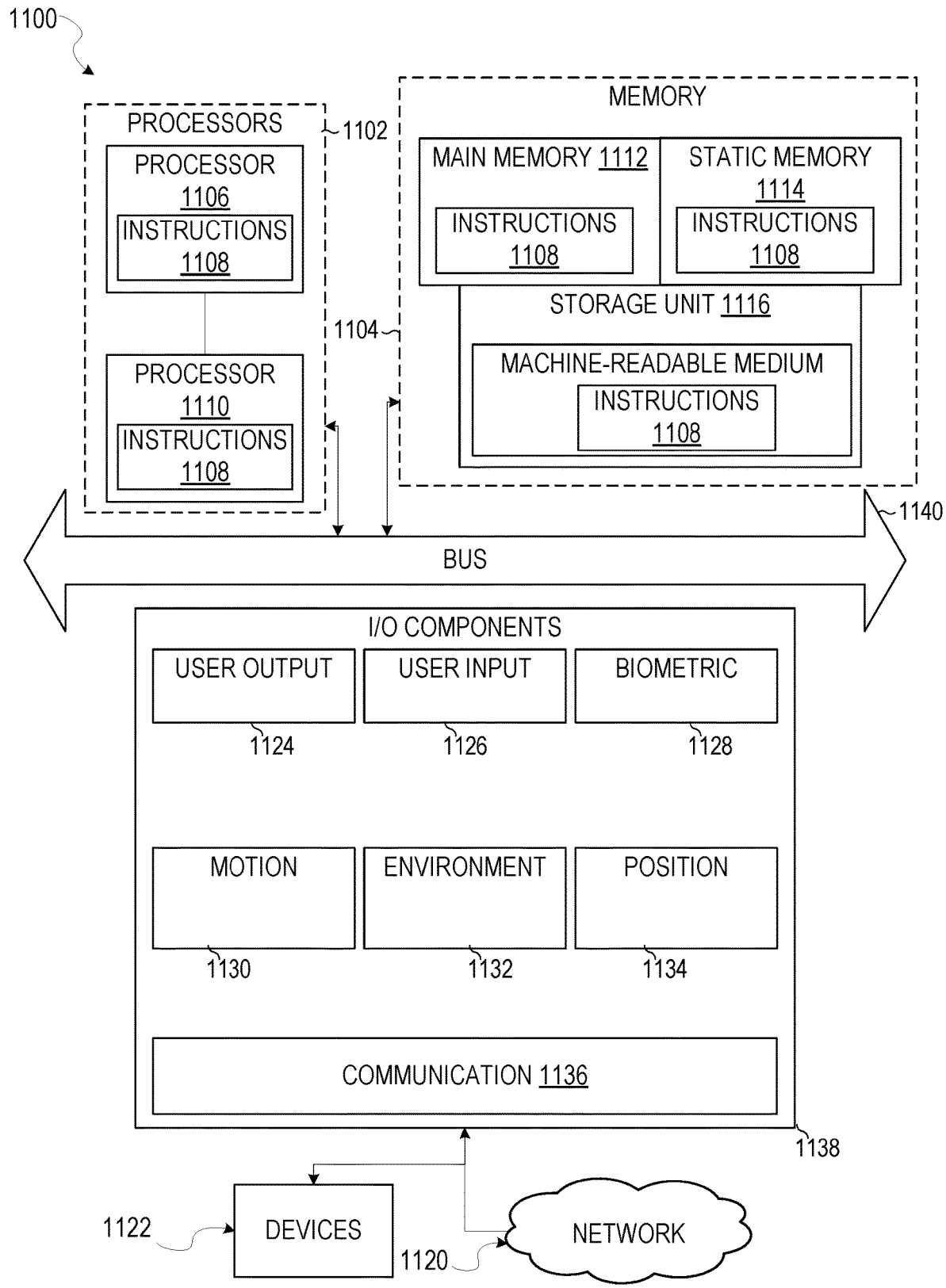
FIG. 11 is a diagrammatic representation of a machine in the form of a computer system within which a set of instructions may be executed for causing the machine to perform any one or more of the methodologies discussed herein, in accordance with some examples.

FIG. 11 is a diagrammatic representation of the machine 1100 within which instructions 1108 (e.g., software, a program, an application, an applet, an app, or other executable code) for causing the machine 1100 to perform any one or more of the methodologies discussed herein may be executed. For example, the instructions 1108 may cause the machine 1100 to execute any one or more of the methods described herein. The instructions 1108 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1108, sequentially or otherwise, that specify actions to be taken by the machine 1100. Further, while only a single machine 1100 is illustrated, the term "machine" shall also be taken to include a collection of machines that individually or jointly execute the instructions 1108 to perform any one or more of the methodologies discussed herein. The machine 1100, for example, may comprise the client device 102 or any one of a number of server devices forming part of the messaging server system 108. In some examples, the machine 1100 may also comprise both client and server systems, with certain operations of a particular method or algorithm being performed on the server-side and with certain operations of the particular method or algorithm being performed on the client-side.

The machine 1100 may include processors 1102, memory 1104, and input/output (I/O) components 1138, which may be configured to communicate with each other via a bus 1140. In an example, the processors 1102 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1106 and a processor 1110 that execute the instructions 1108. The term "processor" is intended to include multi-core processors that may comprise two or more independent processors (sometimes referred to as "cores") that may execute instructions contemporaneously. Although FIG. 11 shows multiple processors 1102, the machine 1100 may include a single processor with a single-core, a single processor with multiple cores (e.g., a multi-core processor), multiple processors with a single core, multiple processors with multiples cores, or any combination thereof.

The memory 1104 includes a main memory 1112, a static memory 1114, and a storage unit 1116, all accessible to the processors 1102 via the bus 1140. The main memory 1104, the static memory 1114, and the storage unit 1116 store the instructions 1108 embodying any one or more of the methodologies or functions described herein. The instructions 1108 may also reside, completely or partially, within the main memory 1112, within the static memory 1114, within machine-readable medium 1118 within the storage unit 1116, within at least one of the processors 1102 (e.g., within the processor's cache memory), or any suitable combination thereof, during execution thereof by the machine 1100.

The I/O components 1138 may include a wide variety of components to receive input, provide output, produce output, transmit information, exchange information, capture measurements, and so on. The specific I/O components 1138 that are included in a particular machine will depend on the type of machine. For example, portable machines such as mobile phones may include a touch input device or other such input mechanisms, while a headless server machine will likely not include such a touch input device. It will be appreciated that the I/O components 1138 may include many other components that are not shown in FIG. 11. In various examples, the I/O components 1138 may include user output components 1124 and user input components 1126. The user output components 1124 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1126 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1138 may include biometric components 1128, motion components 1130, environmental components 1132, or position components 1134, among a wide array of other components. For example, the biometric components 1128 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1130 include acceleration sensor components (e.g., accelerometer), gravitation sensor components, rotation sensor components (e.g., gyroscope).

The environmental components 1132 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera, and a depth sensor, for example.

The position components 1134 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1138 further include communication components 1136 operable to couple the machine 1100 to a network 1120 or devices 1122 via respective coupling or connections. For example, the communication components 1136 may include a network interface component or another suitable device to interface with the network 1120. In further examples, the communication components 1136 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1122 may be another machine or any of a wide variety of peripheral devices (e.g., a peripheral device coupled via a USB).

Moreover, the communication components 1136 may detect identifiers or include components operable to detect identifiers. For example, the communication components 1136 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1136, such as location via Internet Protocol (IP) geolocation, location via Wi-Fi® signal triangulation, location via detecting an NFC beacon signal that may indicate a particular location, and so forth.

The various memories (e.g., main memory 1112, static memory 1114, and memory of the processors 1102) and storage unit 1116 may store one or more sets of instructions and data structures (e.g., software) embodying or used by any one or more of the methodologies or functions described herein. These instructions (e.g., the instructions 1108), when executed by processors 1102, cause various operations to implement the disclosed examples.

The instructions 1108 may be transmitted or received over the network 1120, using a transmission medium, via a network interface device (e.g., a network interface component included in the communication components 1136) and using any one of several well-known transfer protocols (e.g., hypertext transfer protocol (HTTP)). Similarly, the instructions 1108 may be transmitted or received using a transmission medium via a coupling (e.g., a peer-to-peer coupling) to the devices 1122.

Software Architecture

Figure 12:
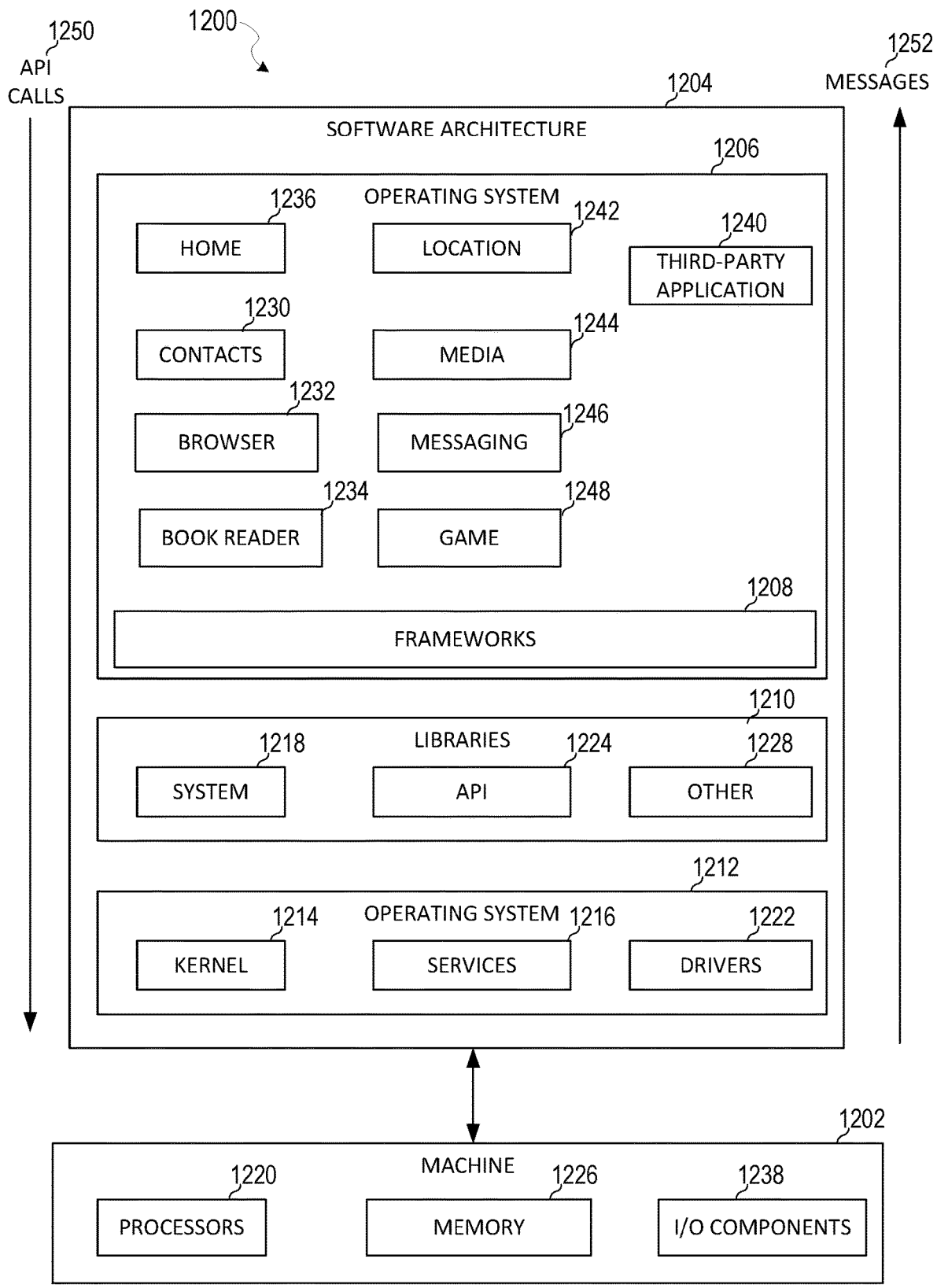
FIG. 12 is a block diagram showing a software architecture within which examples may be implemented.

FIG. 12 is a block diagram 1200 illustrating a software architecture 1204, which can be installed on any one or more of the devices described herein. The software architecture 1204 is supported by hardware such as a machine 1202 that includes processors 1220, memory 1226, and I/O components 1238. In this example, the software architecture 1204 can be conceptualized as a stack of layers, where each layer provides a particular functionality. The software architecture 1204 includes layers such as an operating system 1212, libraries 1210, frameworks 1208, and applications 1206. Operationally, the applications 1206 invoke API calls 1250 through the software stack and receive messages 1252 in response to the API calls 1250.

The operating system 1212 manages hardware resources and provides common services. The operating system 1212 includes, for example, a kernel 1214, services 1216, and drivers 1222. The kernel 1214 acts as an abstraction layer between the hardware and the other software layers. For example, the kernel 1214 provides memory management, processor management (e.g., scheduling), component management, networking, and security settings, among other functionality. The services 1216 can provide other common services for the other software layers. The drivers 1222 are responsible for controlling or interfacing with the underlying hardware. For instance, the drivers 1222 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1210 provide a common low-level infrastructure used by the applications 1206. The libraries 1210 can include system libraries 1218 (e.g., C standard library) that provide functions such as memory allocation functions, string manipulation functions, mathematic functions, and the like. In addition, the libraries 1210 can include API libraries 1224 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1210 can also include a wide variety of other libraries 1228 to provide many other APIs to the applications 1206.

The frameworks 1208 provide a common high-level infrastructure that is used by the applications 1206. For example, the frameworks 1208 provide various graphical user interface (GUI) functions, high-level resource management, and high-level location services. The frameworks 1208 can provide a broad spectrum of other APIs that can be used by the applications 1206, some of which may be specific to a particular operating system or platform.

In an example, the applications 1206 may include a home application 1236, a contacts application 1230, a browser application 1232, a book reader application 1234, a location application 1242, a media application 1244, a messaging application 1246, a game application 1248, and a broad assortment of other applications such as a third-party application 1240. The applications 1206 are programs that execute functions defined in the programs. Various programming languages can be employed to create one or more of the applications 1206, structured in a variety of manners, such as object-oriented programming languages (e.g., Objective-C, Java, or C++) or procedural programming languages (e.g., C or assembly language). In a specific example, the third-party application 1240 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1240 can invoke the API calls 1250 provided by the operating system 1212 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors (e.g., processors 1102) or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
   transmitting, from a client device to a server, a request for a webpage associated with website generation data;
   receiving, from the server, the webpage comprising a first display element corresponding to a first type of object, the webpage being generated by the server according to a first website presentation layer and having first content defined by the website generation data;

causing the server to locally process the website generation data to identify, by the server, the first type of object; and causing the server to retrieve from centralized storage, using an address of the centralized storage, a translator that maps the first type of object to the first website presentation layer, wherein the server locally identifies, based on the retrieved translator, a local storage location of the first website presentation layer and retrieves the first website presentation layer from the local storage location to generate the webpage.

2. The method of claim 1, wherein the website generation data comprises code objects that define objects of the webpage and behaviors of the webpage, and wherein the first content comprises at least one of a behavior or textual information.

3. The method of claim 1, wherein the first website presentation layer is stored on a first storage repository associated with a first entity, wherein the website generation data is stored on a second storage repository associated with a second entity, wherein one or more references to a plurality of translators associated with a plurality of entities are stored on the second storage repository associated with the second entity, wherein the plurality of translators is stored on the centralized storage, and wherein one or more references to the first website presentation layer stored on the first storage repository associated with the first entity are stored on the second storage repository associated with the second entity.

4. The method of claim 1, further comprising:
generating code based on the first website presentation layer, wherein the code is executed by a web browser to display the webpage, wherein a first portion of the webpage is displayed based on a shared presentation layer comprising the first website presentation layer defined by a first entity, wherein a second portion of the webpage is displayed based on a second website presentation layer defined by a second entity, and wherein the first and second portions of the webpage are displayed together.

5. The method of claim 1, wherein each website presentation layer of a plurality of website presentation layers defines an appearance of a respective type of object, further comprising:
causing the centralized storage to provide the translator to the server.

6. The method of claim 5, wherein the server locally stores a database that maps each type of object to a respective website presentation layer of the plurality of website presentation layers.

7. The method of claim 1, wherein the translator and the first website presentation layer process a JSON file comprising the website generation data to generate a JavaScript file that defines an appearance of objects in the JSON file.

8. The method of claim 1, further comprising:
receiving, from a first entity, the website generation data; and
storing the website generation data received from the first entity on a content management system.

9. The method of claim 8, further comprising:
receiving, from a second entity, a plurality of website presentation layers; and
storing the plurality of website presentation layers on the centralized storage associated with the second entity, wherein the second entity is different from the first entity.

10. The method of claim 9, wherein the centralized storage stores a mapping between each of the plurality of website presentation layers and a respective type of object.

11. The method of claim 1, wherein a plurality of website presentation layers is shared across a plurality of entities to maintain a consistent appearance for the first type of object across a plurality of websites associated with different entities.

12. The method of claim 11, wherein the website generation data is associated with a first entity, and wherein the webpage is a first webpage associated with the first entity, further comprising:
retrieving additional website generation data associated with a second entity;
identifying the first type of object in the additional website generation data; and
generating, for display on a second webpage, a second display element corresponding to the first type of object according to an appearance defined by the first website presentation layer and having second content defined by the additional website generation data.

13. The method of claim 12, further comprising:
receiving, from a provider of the plurality of website presentation layers, an update to the appearance defined by the first website presentation layer; and
automatically updating the appearance of the first and second display elements on the first and second webpages.

14. The method of claim 1, wherein the first type of object comprises a button that is linked to another webpage, wherein the first website presentation layer causes the first display element corresponding to the first type of object to be presented with a first color and first shape, further comprising:
identifying a second type of object in the website generation data, the second type of object comprising a button that initiates download of an application; and
identifying, based on the retrieved translator, a storage location of a second website presentation layer associated with the second type of object, wherein the second website presentation layer causes a second display element corresponding to the second type of object to be presented with a second color and second shape that differs from the first color and first shape of the first display element.

15. The method of claim 1, wherein a plurality of website presentation layers defines different looks and feels for different object types independently of content or behavior of the object types, and wherein the plurality of website presentation layers include the first website presentation layer that defines a position and placement of the first display element on the webpage.

16. A system comprising:
a processor on a client device configured to perform operations comprising:
transmitting, to a server, a request for a webpage associated with website generation data;
receiving, from the server, the webpage comprising a first display element corresponding to a first type of object, the webpage being generated by the server according to a first website presentation layer and having first content defined by the website generation data;

causing the server to locally process the website generation data to identify, by the server, the first type of object; and causing the server to retrieve from centralized storage, using an address of the centralized storage, a translator that maps the first type of object to the first website presentation layer, wherein the server locally identifies, based on the retrieved translator, a local storage location of the first website presentation layer and retrieves the first website presentation layer from the local storage location to generate the webpage.

17. The system of claim 16, wherein the website generation data comprises code objects that define objects of the webpage and behaviors of the webpage, and wherein the first content comprises at least one of a behavior or textual information.

18. The method of claim 15, wherein a second website presentation layer defines display of a given type of object as a pop-up on the webpage.

19. A non-transitory machine-readable storage medium that includes instructions that, when executed by one or more processors of a client device, cause the client device to perform operations comprising:

transmitting, to a server, a request for a webpage associated with website generation data;

receiving, from the server, the webpage comprising a first display element corresponding to a first type of object, the webpage being generated by the server according to a first website presentation layer and having first content defined by the website generation data;

causing the server to locally process the website generation data to identify, by the server, the first type of object; and causing the server to retrieve from centralized storage, using an address of the centralized storage, a translator that maps the first type of object to the first website presentation layer, wherein the server locally identifies, based on the retrieved translator, a local storage location of the first website presentation layer and retrieves the first website presentation layer from the local storage location to generate the webpage.

20. The non-transitory machine-readable storage medium of claim 19, wherein the website generation data comprises code objects that define objects of the webpage and behaviors of the webpage, and wherein the first content comprises at least one of a behavior or textual information.

* * * * *